United States Patent
Jackson

(10) Patent No.: US 8,493,885 B2
(45) Date of Patent: Jul. 23, 2013

(54) SYSTEM AND METHOD FOR DISTRIBUTED PROCESSING IN AN INTERNET PROTOCOL NETWORK

(75) Inventor: James Jackson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1525 days.

(21) Appl. No.: 11/767,237

(22) Filed: Jun. 22, 2007

(65) Prior Publication Data
US 2008/0317001 A1 Dec. 25, 2008

(51) Int. Cl.
*H04L 12/28* (2006.01)
(52) U.S. Cl.
USPC ............................. 370/254; 370/352; 370/401
(58) Field of Classification Search
None
See application file for complete search history.

(56) References Cited

U.S. PATENT DOCUMENTS

| | | | |
|---|---|---|---|
| 6,735,289 B1 | 5/2004 | Shanmugham | |
| 6,822,755 B2 | 11/2004 | Kurtz | |
| 6,980,560 B2 | 12/2005 | Ryan et al. | |
| 2003/0072272 A1 | 4/2003 | Koide et al. | |
| 2003/0101222 A1 | 5/2003 | Lyonnaz | |
| 2003/0133144 A1 | 7/2003 | Kurtz | |
| 2003/0206563 A1 | 11/2003 | Lazarus et al. | |
| 2004/0202295 A1* | 10/2004 | Shen et al. | 379/112.01 |
| 2005/0105512 A1* | 5/2005 | Myhre et al. | 370/352 |
| 2007/0143858 A1* | 6/2007 | Hearty | 726/27 |
| 2008/0285088 A1* | 11/2008 | Tidwell et al. | 358/402 |

* cited by examiner

*Primary Examiner* — Gregory Sefcheck
*Assistant Examiner* — Daniel Mitchell

(57) ABSTRACT

A system and method for distributed processing in an Internet Protocol network is provided. A system that incorporates teachings of the present disclosure may include, for example, an application server can have a controller element to receive a Session Initiation Protocol (SIP) INVITE message from a communication device, establish a Real Time Protocol (RTP) channel between the communication device and the application server responsive to the SIP INVITE message, and submit a SIP SUBSCRIBE message to an intermediate communication node (ICN) directing the ICN to engage one or more Digital Signal Processing (DSP) resources for processing signals in the RTP channel. Additional embodiments are disclosed.

25 Claims, 4 Drawing Sheets

300

SYSTEM AND METHOD FOR DISTRIBUTED PROCESSING IN AN INTERNET PROTOCOL NETWORK

FIELD OF THE DISCLOSURE

The present disclosure relates generally to communication techniques and more specifically to a system and method for distributed processing in an Internet Protocol (IP) network.

BACKGROUND

Convergence of legacy analog communication devices with packet-switched voice communication systems can give rise to inefficient use of hardware resources. For instance, in a Unified Messaging System (UMS) operating in an IP network that can provide unified services such as voicemail, email, and fax messaging, an application server of the UMS can be used to manage call flow functions and hardware resources such as those belonging to a media server for processing media signals. The media server typically can have a number of costly Digital Signal Processing (DSP) resources which can be used to perform a number of functions such as voice signal processing, Dual Tone Multi-Frequency (DTMF) signal processing, and fax processing—just to mention a few.

For some Voice over Internet Protocol (VoIP) applications such as voicemail, the application server of the UMS can process media streams without encoding or decoding the media with the DSP resources of the media server. Consequently, in some instances the cost effectiveness of the DSP resources of the media server can be put to question.

A need therefore arises for a system and method for distributed processing in an IP network.

DETAILED DESCRIPTION

Embodiments in accordance with the present disclosure provide a system and method for distributed processing in an IP network.

In one embodiment of the present disclosure, a computer-readable storage medium can have computer instructions for receiving a Session Initiation Protocol (SIP) SUBSCRIBE message requesting fax detection on a select Real Time Protocol (RTP) channel, determining whether a fax signal is present in the select RTP channel, and submitting a SIP NOTIFY message that indicates whether the fax signal has been detected in the select RTP channel.

In another embodiment of the present disclosure, an application server can have a controller element to receive a SIP INVITE message from a communication device, establish an RTP channel between the communication device and the application server responsive to the SIP INVITE message, and submit a SIP SUBSCRIBE message to an intermediate communication node (ICN) directing the ICN to engage one or more Digital Signal Processing (DSP) resources for processing signals in the RTP channel.

In another embodiment of the present disclosure, an Analog Telephony Adapter (ATA) can have a controller element to receive analog fax signals from a computing device coupled to the ATA, transcode the analog fax signals, generate a SIP INVITE message with the transcoded analog fax signals, and submit the SIP INVITE message to an application server. The application server can establish an RTP channel with the ATA responsive to the SIP INVITE message, submit a SIP SUBSCRIBE message to an intermediate node requesting that the intermediate node monitor the RTP channel for fax signals, and receive from the intermediate node a SIP NOTIFY message indicating that the transcoded analog fax signals have been detected. The controller element can further receive from the application server a SIP re-INVITE message requesting Fax over Internet Protocol (FoIP) signals over the RTP channel.

In another embodiment of the present disclosure, a method can involve submitting to a network element a SIP message directing the network element to dynamically engage or disengage one or more DSP resources of the network element.

Figure 1:
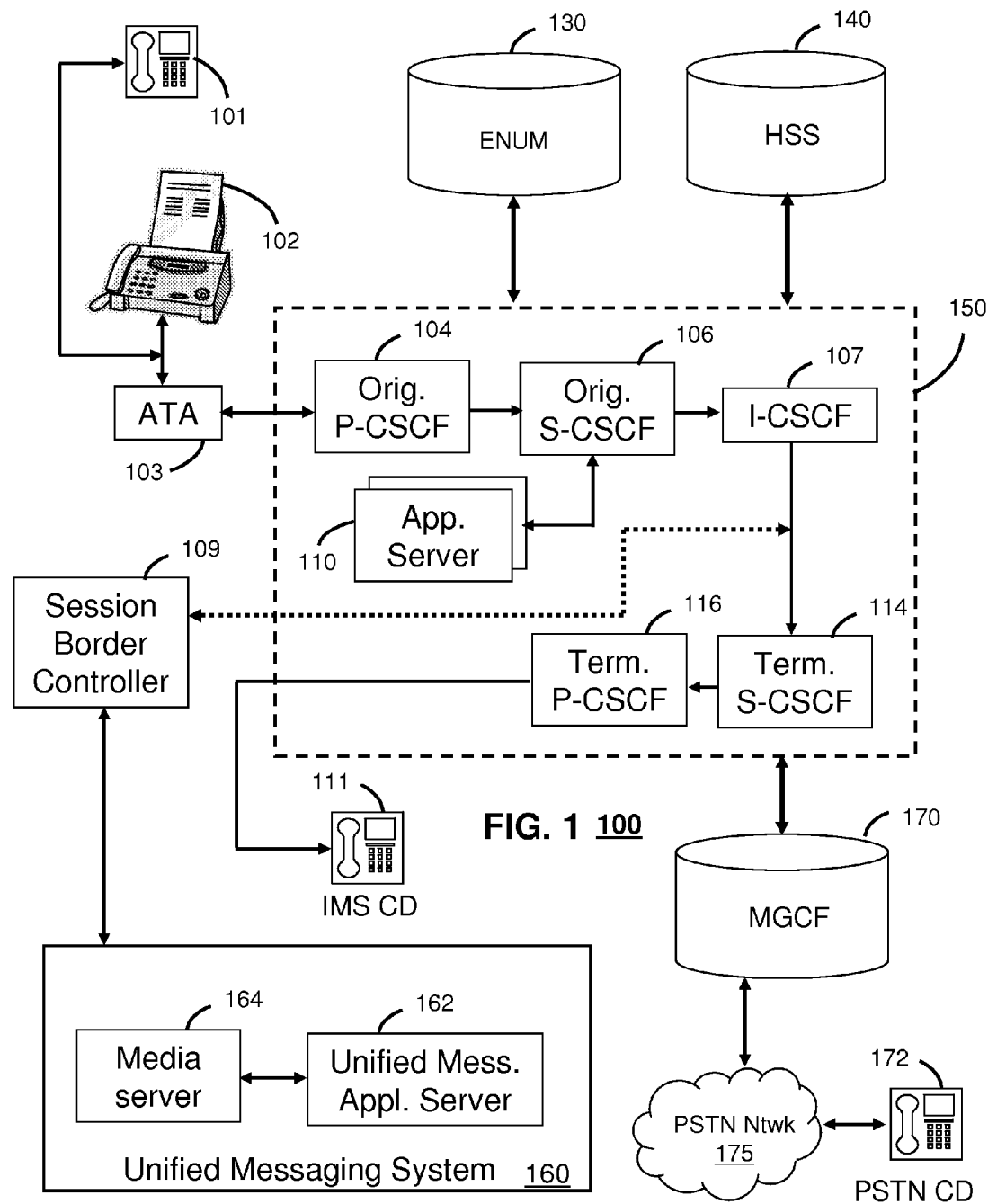
FIG. 1 depicts an exemplary embodiment of a communication system.

FIG. 1 depicts an exemplary communication system 100. The communication 100 can comprise a Home Subscriber Server (HSS) 140, a tElephone NUmber Mapping (ENUM) server 130, and common network elements of an IMS network 150. The IMS network 150 can be coupled to IMS communication devices such as an IMS-compliant phone 111, or an IMS-compliant Unified Messaging System (UMS) 160 that provides unified messaging services such as voicemail, email, fax, and so on. Public Switched Telephone Network (PSTN) devices such as a PSTN phone 101 and PSTN fax machine 102 can be coupled to the IMS network 150 by way of an Analog Telephony Adaptor (ATA) 103 that converts PSTN signals to IMS compliant signals and vice-versa by common transcoding techniques. Alternatively, PSTN phones such as reference 172 can be accessed by the IMS network 150 by way of a Media Gateway Control Function (MGCF) 170 coupled to a PSTN network 175.

The UMS 160 can comprise a unified messaging application server 162 that utilizes common computing technologies to manage operations of one or more media servers 164. The media server 164 can be used as an off-the-shelf server (e.g., a Linux or Unix server) that performs media processing functions on media streams received from the IMS network 150 that do not require the resources of digital signal processors (DSPs) for encoding and decoding the media. To reduce cost, the UMS 160 can be coupled to an intermediate communication node such as a Session Border Controller (SBC) 109 which can be equipped with DSP resources. Thus, when the UMS 160 has a need for DSP resources to perform fax detection or Dual Tone Multi-Frequency (DTMF) signal processing, among other things, the UMS can call on the resources of the SBC 109.

To establish a communication session between devices, the IMS network 150 can utilize an originating Serving Call Session Control Function (S-CSCF) 106. The originating S-CSCF 106 can submit queries to the ENUM server 130 to translate an E.164 telephone number to a SIP Uniform Resource Identifier (URI) if the targeted communication device is IMS compliant. If the targeted communication device is a PSTN device such as reference 172, the ENUM server 130 will respond with an unsuccessful query and the originating S-CSCF 106 will forward the call to the MGCF 170 which connects the call through the PSTN network 175 using common signaling means such as SS7.

In the case where the ENUM server 130 returns a SIP URI, the SIP URI is used by an Interrogating CSCF (I-CSCF) 107 to submit a query to the HSS 140 to identify a terminating S-CSCF 114 associated with a targeted IMS communication device such as IMS CD 111. Once identified, the I-CSCF 107 can submit the SIP INVITE message to the terminating S-CSCF 114 which then identifies a terminating P-CSCF 116 associated with the targeted communication device. The P-CSCF 116 can then signal the communication device to establish communications. When the targeted IMS communication device is the UMS 160, the HSS 140 will identify the SBC 109 associated with the UMS. The I-CSCF 107 will then establish communications with the UMS 160 by way of the SBC 109. The aforementioned process is in part symmetrical. Accordingly, the terms "originating" and "terminating" in FIG. 1 can be interchanged.

In addition to the aforementioned network elements of the IMS network 150, there can be a number of application servers 110 which can provide a variety of services to IMS subscribers. For example, the application server 110 can be used to perform originating treatment functions on the calling party number received by the S-CSCF 106 in the SIP INVITE message. Originating treatment functions can include determining whether the calling party number has international calling services, and/or is requesting special telephony features (e.g., *72 forward calls, *73 cancel call forwarding, etc.).

Figure 2:
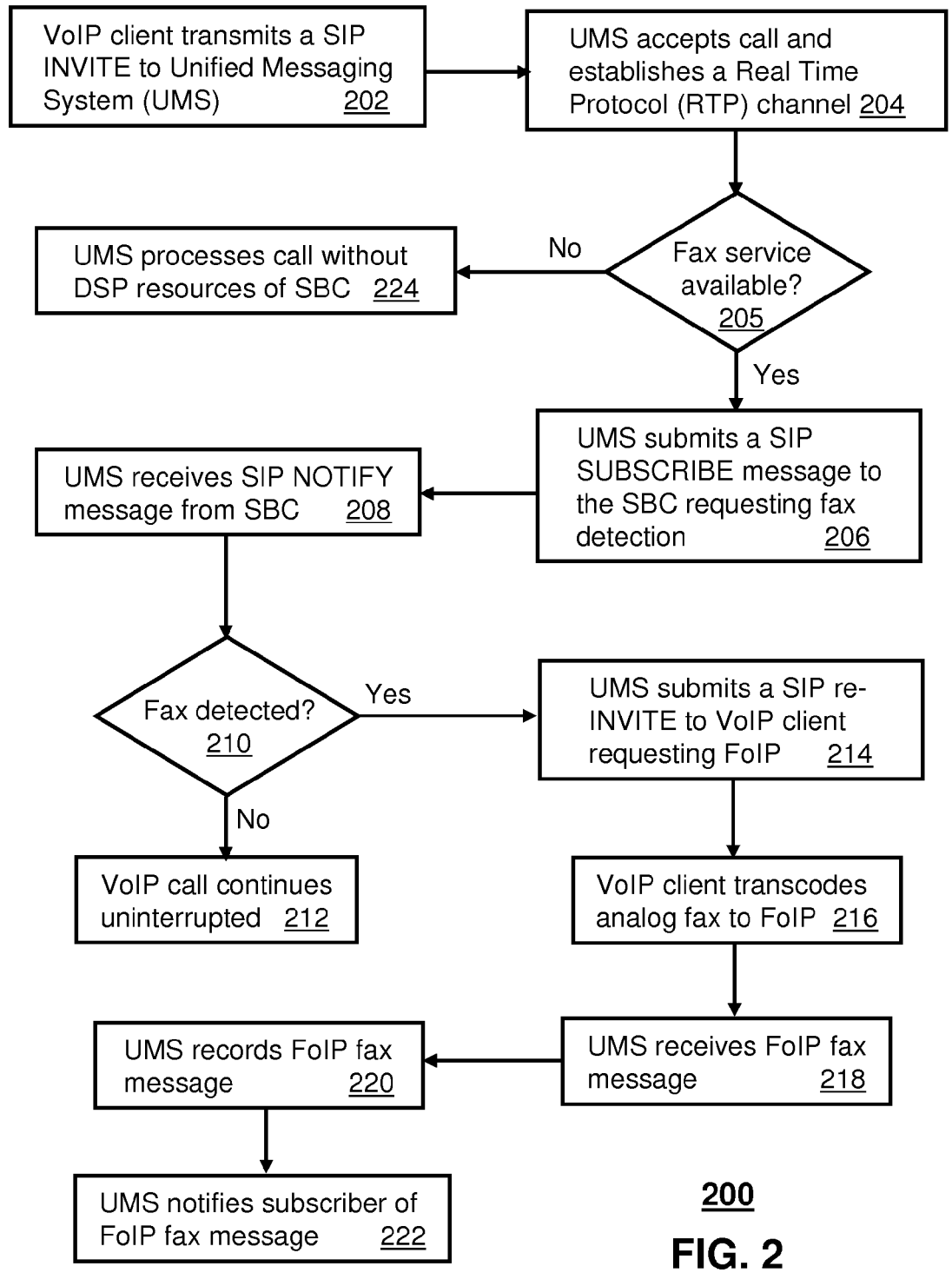
FIG. 2 depicts exemplary method operating in portions of the communication system.

FIG. 2 depicts an exemplary method 200 operating in portions of the communication system 100. Method 200 begins with step 202 in which a Voice over IP (VoIP) client assumed for illustration purposes to be the ATA 103 transmits a SIP INVITE message directed to the UMS 160. The SIP INVITE message can be generated in response to a call invoked by the PSTN phone 101 or the fax machine 102. In step 204 the UMS 160 receives and accepts the call according to the steps described above for establishing communications in the IMS network 150. The acceptance of the call creates a Real Time Protocol (RTP) channel between the UMS 160 and the ATA 103.

In step 205 the UMS 160 can determine on a call-by-call basis whether the calling party is subscribed to a fax service according to a UMS account identified by the SIP INVITE message. For example, the SIP INVITE message can be directed to a subscriber mailbox that does not support fax services, or the SIP INVITE message is associated with a voicemail message retrieval call in which case fax detection would not be required. In this instance, the UMS 160 can proceed to 224 where it processes the call without engaging DSP resources of the SBC 109.

If on the other hand, the SIP INVITE message is associated with a subscriber account that supports fax services, the UMS 160 proceeds to step 206 where it submits a SIP SUBSCRIBE message to the SBC 109 to engage its DSP resources to determine if a fax signal is present is in the RTP channel using common fax detection techniques. The fax detection request of the SIP SUBSCRIBE message can further include a parameter that defines a fax detection period. The fax detection period can be used to limit the time in which the DSP resources are engaged to perform fax detection (e.g., not to exceed 5 seconds).

In step 208, the SBC 109 responds to the UMS 160 with a SIP NOTIFY message which indicates whether a fax signal was detected. If the SIP NOTIFY message indicates in step 210 that no fax signal is present, then the UMS 160 proceeds to step 212 where the VoIP call established over the RTP channel continues uninterrupted. This scenario can occur when a calling party for instance is dials into the UMS 160 using the PSTN phone 101 couple to the ATA 103 to retrieve voicemail and other messages.

If on the other hand the SIP NOTIFY message indicates a fax signal has been detected in step 210, the UMS 160 proceeds to step 214 where it submits a SIP re-INVITE message to the ATA 103 requesting that it transcode the original analog fax signal in a T.30 format to a Fax over IP (FoIP) format that conforms to for example a T.38 protocol defined by the International Telecommunication Union (ITU). Responsive to the SIP re-INVITE message the ATA 103 transcodes the analog fax signal to a FoIP signal in step 216 which is received by the UMS 160 in step 218 and recorded in step 220. Once the fax transmission is completed, the UMS 160 can be programmed to notify the UMS subscriber targeted by the call that a fax message has been received. The notification can be a light indicator on a phone of the subscriber, an email, or some other suitable form of notification.

Figure 3:
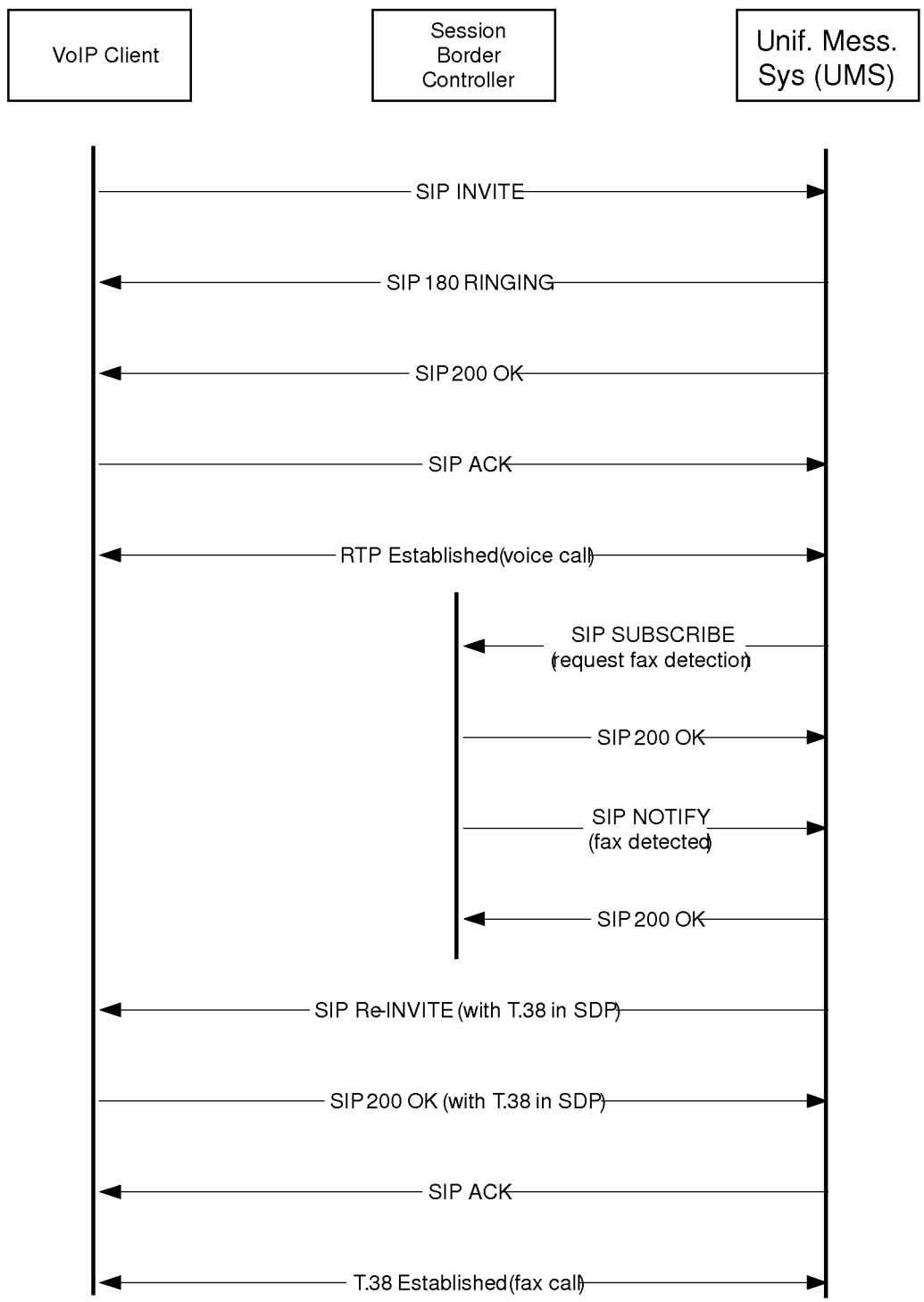
FIG. 3 depicts an exemplary flow diagram that illustrates the method of FIG. 2.

FIG. 3 depicts an exemplary flow diagram that illustrates the steps just described for method 200.

Upon reviewing the embodiments disclosed, it would be evident to an artisan with ordinary skill in the art that said embodiments can be modified, reduced, or enhanced without departing from the scope and spirit of the claims described below. For example, method 200 can be modified so that the SBC 109 can be directed instead with a different SIP SUBSCRIBE message to process DTMF tones supplied by the originating VoIP client. The DTMF tones can be in-band DTMF tones (e.g., tones encoded in the audio speech band) and/or out-of-band DTMF tones used for generating event packets. DTMF tone processing can be useful in applications where the VoIP client is presented a synthesized call flow application by way of an interactive voice response system operating in the UMS 160.

In general terms, the SIP SUBSCRIBE message sent to the SBC 109 can also include requests for other applications that require DSP resources. In this more general embodiment the UMS 160 can dynamically define the purpose for engaging the DSP resources. For example, the SIP SUBSCRIBE message can include a request to apply other algorithms to process signals in the RTP channel, the duration of the processing, and/or other metrics. Similarly, the SIP NOTIFY message can be used to provide the UMS 160 the results produced by these algorithms. In yet another embodiment, a select SIP message can be configured with one or more instructive messages that can be used to direct one or more network elements of communication system 100 to enable or disable DSP resources of said network elements to perform functions such as fax or DTMF detection as described above, or any other signal processing function suitable to an application invoking the request.

Other suitable modifications can be applied to the present disclosure without departing from the scope of the claims below. Accordingly, the reader is directed to the claims for a fuller understanding of the breadth and scope of the present disclosure.

Figure 4:
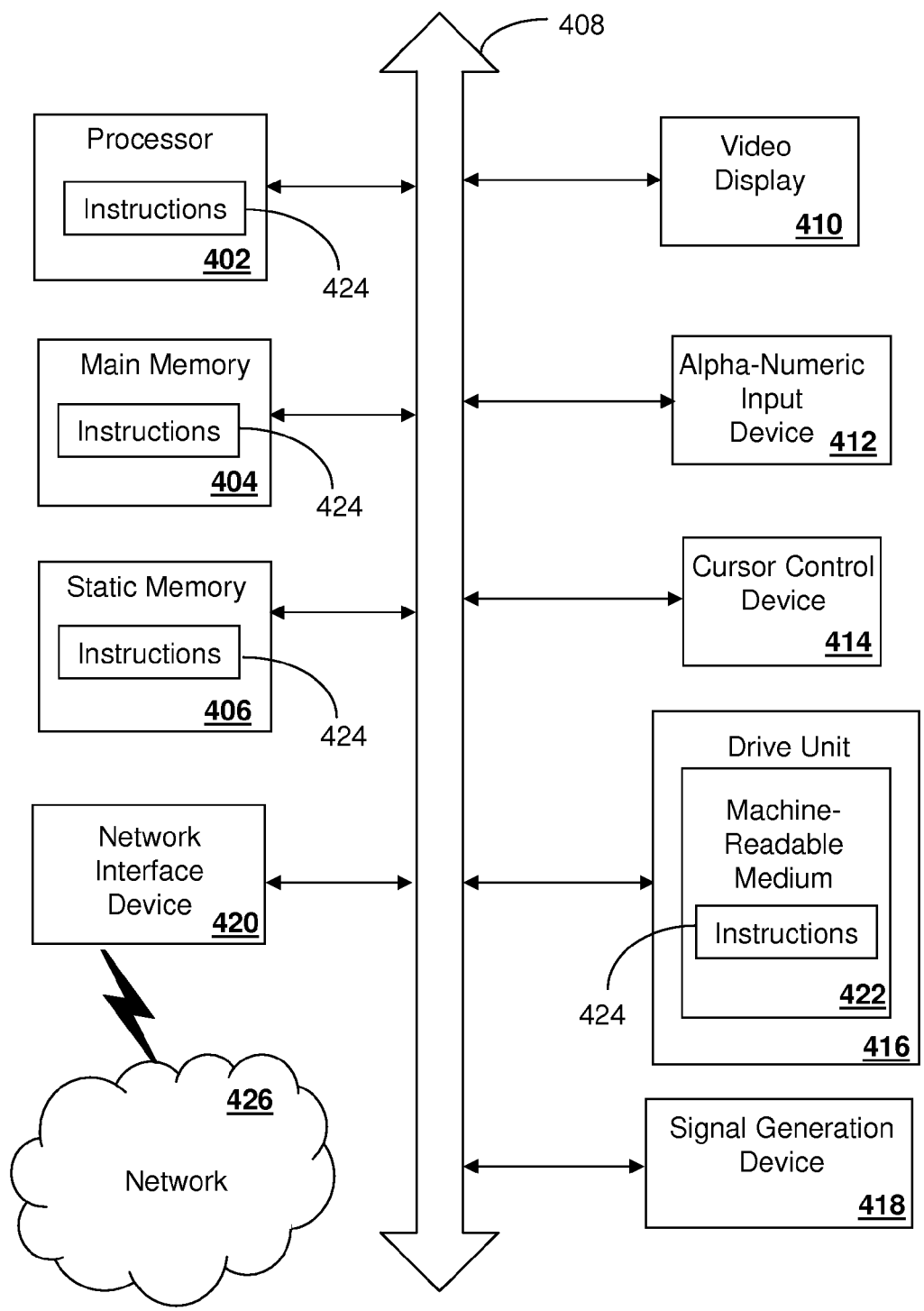
FIG. 4 depicts an exemplary diagrammatic representation of a machine in the form of a computer system within which a set of instructions, when executed, may cause the machine to perform any plurality of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An analog telephony adapter, comprising:
   a processor; and
   a computer-readable medium, the computer-readable medium storing a plurality of instructions which, when executed by the processor, cause the processor to perform operations, the operations comprising:
      receiving analog fax signals from a computing device coupled to the analog telephony adapter;
      transcoding the analog fax signals;
      generating a session initiation protocol invite message for the analog fax signals that are transcoded;
      submitting the session initiation protocol invite message to an application server, wherein the application server is for establishing a real time protocol channel with the analog telephony adapter responsive to the session initiation protocol invite message, wherein the application server is for submitting a session initiation protocol subscribe message to an intermediate node requesting that the intermediate node monitor the real time protocol channel for fax signals, wherein the intermediate node is for determining the analog fax signals that are transcoded are present in response to the intermediate node receiving the session initiation protocol subscribe message from the application server requesting the intermediate node monitor the real time protocol channel for fax signals, and wherein the application server is further for receiving from the intermediate node a session initiation protocol notify message indicating that the analog fax signals that are transcoded have been detected; and
      receiving from the application server a session initiation protocol re-invite message requesting fax over internet protocol signals over the real time protocol channel.

2. The analog telephony adapter of claim 1, wherein the analog fax signals are transcoded to the fax over internet protocol signals in response to the session initiation protocol re-invite message.

3. The analog telephony adapter of claim 1, wherein the fax over internet protocol signals conform to a T.38 protocol.

4. The analog telephony adapter of claim 1, wherein the intermediate node comprises a session border controller.

5. The analog telephony adapter of claim 1, wherein the analog fax signals that are transcoded comply with a T.30 protocol.

6. The analog telephony adapter of claim 1, wherein the session initiation protocol notify message comprises a message indicating a fax signal has been detected in the real time protocol channel.

7. The analog telephony adapter of claim 1, wherein the application server operates in an internet protocol multimedia subsystem network.

8. The analog telephony adapter of claim 1, wherein the intermediate node is further for engaging digital signal processing resources to determine the analog fax signals are present.

9. The analog telephony adapter of claim 8, wherein the session initiation protocol subscribe message includes a fax detection period that establishes a limited time for a digital signal processing resource of the intermediate node to be engaged.

10. The analog telephony adapter of claim 1, wherein the intermediate node is further for processing signals in the real time protocol channel according to a T.30 protocol.

11. A method comprising:
    receiving, by an analog telephony adapter, analog fax signals from a computing device coupled to the analog telephony adapter;
    transcoding, by the analog telephony adapter, the analog fax signals;
    generating, by the analog telephony adapter, a session initiation protocol invite message for the analog fax signals that are transcoded;
    submitting, by the analog telephony adapter, the session initiation protocol invite message to an application server, wherein the application server is for establishing a real time protocol channel with the analog telephony adapter responsive to the session initiation protocol invite message, wherein the application server is for submitting a session initiation protocol subscribe message to an intermediate node requesting that the intermediate node monitor the real time protocol channel for fax signals, wherein the intermediate node is for determining the analog fax signals that are transcoded are present in response to the intermediate node receiving the session initiation protocol subscribe message from the application server requesting the intermediate node monitor the real time protocol channel for fax signals, and wherein the application server is further for receiving from the intermediate node a session initiation protocol notify message indicating that the analog fax signals that are transcoded have been detected; and
    receiving, by the analog telephony adapter, from the application server a session initiation protocol re-invite message requesting fax over internet protocol signals over the real time protocol channel.

12. The method of claim 11, wherein the intermediate node comprises a session border controller.

13. The method of claim 11, wherein the analog fax signals that are transcoded comply with a T.30 protocol.

14. The method of claim 11, wherein the session initiation protocol notify message comprises a message indicating a fax signal has been detected in the real time protocol channel.

15. The method of claim 11, wherein the application server operates in an internet protocol multimedia subsystem network.

16. The method of claim 11, wherein the intermediate node is further for engaging digital signal processing resources to determine the analog fax signals are present.

17. The method of claim 16, wherein the session initiation protocol subscribe message includes a fax detection period that establishes a limited time for a digital signal processing resource of the intermediate node to be engaged.

18. The method of claim 11, wherein the intermediate node is further for processing signals in the real time protocol channel according to a T.30 protocol.

19. The method of claim 11, wherein the fax over internet protocol signals conform to a T.38 protocol.

20. A non-transitory computer-readable medium storing instructions which, when executed by a processor of an analog telephony adapter, cause the processor to perform operations, the operations comprising:

receiving analog fax signals from a computing device coupled to the analog telephony adapter;

transcoding the analog fax signals;

generating a session initiation protocol invite message for the analog fax signals that are transcoded;

submitting the session initiation protocol invite message to an application server, wherein the application server is for establishing a real time protocol channel with the analog telephony adapter responsive to the session initiation protocol invite message, wherein the application server is for submitting a session initiation protocol subscribe message to an intermediate node requesting that the intermediate node monitor the real time protocol channel for fax signals, wherein the intermediate node is for determining the analog fax signals that are transcoded are present in response to the intermediate node receiving the session initiation protocol subscribe message from the application server requesting the intermediate node monitor the real time protocol channel for fax signals, and wherein the application server is further for receiving from the intermediate node a session initiation protocol notify message indicating that the analog fax signals that are transcoded have been detected; and receiving from the application server a session initiation protocol re-invite message requesting fax over internet protocol signals over the real time protocol channel.

21. The non-transitory computer-readable medium of claim 20, wherein the session initiation protocol notify message comprises a message indicating a fax signal has been detected in the real time protocol channel.

22. The non-transitory computer-readable medium of claim 20, wherein the intermediate node is further for engaging digital signal processing resources to determine the analog fax signals are present.

23. The non-transitory computer-readable medium of claim 22, wherein the session initiation protocol subscribe message includes a fax detection period that establishes a limited time for a digital signal processing resource of the intermediate node to be engaged.

24. The non-transitory computer-readable medium of claim 20, wherein the intermediate node is further for processing signals in the real time protocol channel according to a T.30 protocol.

25. The non-transitory computer-readable medium of claim 20, wherein the fax over internet protocol signals conform to a T.38 protocol.

* * * * *